R. H. BARNES.
AUTOMOBILE SPEED GOVERNOR AND LOCK.
APPLICATION FILED JAN. 11, 1917.
1,321,355.
Patented Nov. 11, 1919.
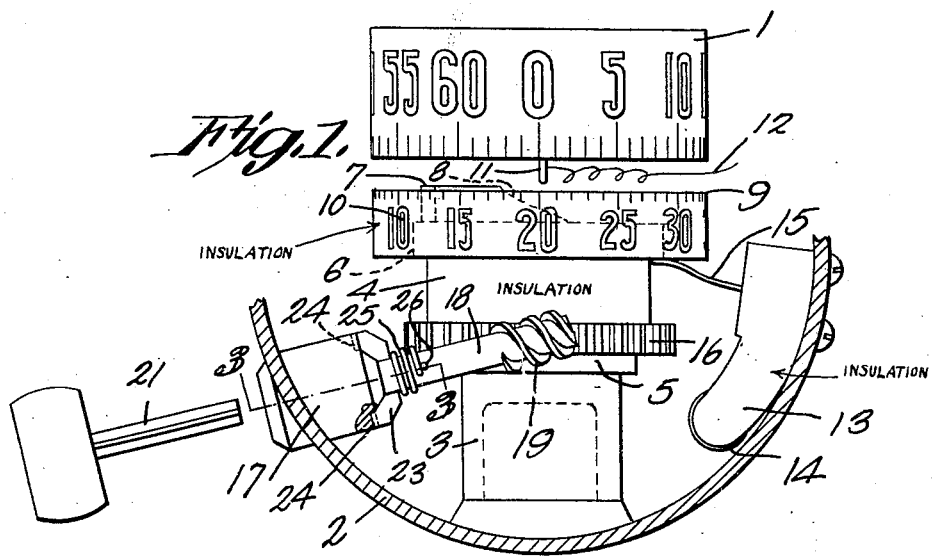
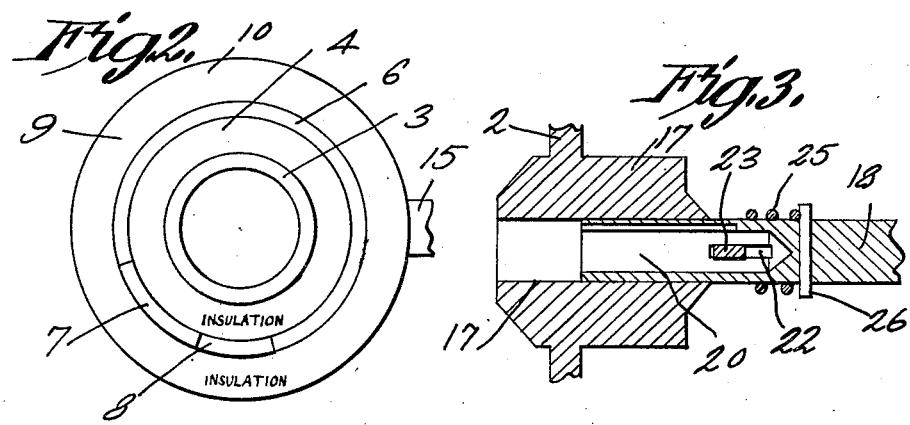
Witnesses
R. H. Barnes,
Inventor
Attorneys

UNITED STATES PATENT OFFICE.

ROBERT H. BARNES, OF EUTAW, ALABAMA.

AUTOMOBILE SPEED-GOVERNOR AND LOCK.

1,321,355.  Specification of Letters Patent.  Patented Nov. 11, 1919.

Application filed January 11, 1917. Serial No. 141,874.

*To all whom it may concern:*

Be it known that I, ROBERT H. BARNES, a citizen of the United States, residing at Eutaw, in the county of Greene and State of Alabama, have invented a new and useful Automobile Speed-Governor and Lock, of which the following is a specification.

The present invention relates to a lock for speed governors for use upon automobiles, and aims to provide a novel and improved device for use in connection with a speedometer of any suitable sort and acting as a controller for an electrical circuit, such as the ignition circuit of the engine, whereby the present device is operable for preventing the operation of the automobile at a speed above a predetermined number of miles per hour, the device also being operable to prevent the operation of the automobile, thereby serving as an automobile lock.

A further object of the invention is the provision of a circuit controlling device for speedometers embodying a novel assemblage of the component elements, to enhance the utility and efficiency of the device.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is an elevation of the device as used in connection with the indicator element of a speedometer, portions being broken away.

Fig. 2 is a plan view of the device, portions being broken away and removed.

Fig. 3 is an enlarged sectional detail taken on the line 3—3 of Fig. 1.

In the drawing, there is illustrated a fragmental portion of a conventional type of speedometer, it being understood that the present improvements can be used in connection with various speedometers. The speedometer illustrated has the rotatable indicating element 1 inclosed within a casing 2 which houses the other parts of the mechanism.

In carrying out the invention, a post or standard 3 is carried by the bottom of the casing 2 or other suitable supporting member, and this post may be tubular or hollow to accommodate the gearing of the speedometer when desired or necessary. Mounted for rotation upon the post 3 is a sleeve 4 of suitable insulating material, and supported by a collar 5 secured on the post. A ring 6 of metal or other conducting material for electrical energy is fitted upon the sleeve 4 near its upper end, and is provided with an upstanding arcuate flange 7 of suitable length, one end of which is inclined, as at 8. Fixed upon the ring 6 is a ring 9 of insulating material, and the periphery of the ring 9 is provided with a suitable scale of graduations 10 enabling the device to be adjusted for controlling the speed as desired.

A finger or pin 11 is secured in any suitable manner to the rotatable element or member 1 of the speedometer and is movable closely over the flange 7, one conductor 12 of an electrical circuit, such as the ignition circuit of the engine, being connected in any suitable manner, either directly or indirectly, with the pin 11. Another insulated conductor 13 of the circuit extends through an aperture 14 in the casing 2 and has a spring terminal or brush 15 bearing upwardly against the lower edge of the ring 6. Thus, when the pin 11 is over the flange 7, the circuit is closed between the conductors 13 and 12, thereby enabling the electrical current to flow through the circuit, which is essential to the operation of the engine, but when the pin 11 is removed from the flange 7 due to the operation of the automobile above a predetermined speed, the circuit is opened, thereby preventing the further operation of the engine or the like. Thus, by setting the sleeve 4 at various positions to adjust the flange 7 correspondingly, the circuit will be opened when the element 1 is turned beyond a certain angle, whereby the pin 11 is removed sufficiently far from the flange 7 to break the circuit. The sleeve 4 can be set at various positions to control the speed as desired, and to use the device as an automobile lock, the sleeve 4 is moved to zero position, whereby should the automobile be operated, the moment that the element 1 turns away from zero position, the circuit will be opened, thereby preventing the operation of the machine.

As a means for setting the sleeve 4, the following device is used: A worm wheel 16 is secured upon the lower end of the sleeve 4, and the casing 2 is equipped with a bearing 17 having a bore 17' in which one terminal of a shaft or spindle 18 is journaled. Secured upon this shaft is a multi-thread worm 19 meshing with the worm wheel 16, and due to the fact that the shaft 18 and worm 19 are arranged obliquely relative to the plane of the worm wheel 16, the teeth of the worm wheel need not be arranged obliquely but can be disposed at right angles to the plane of the worm wheel. The outer terminal of the shaft 18 which is journaled in the bearing 17 is provided with a suitable key-receiving socket or means 20 for the engagement of a proper key 21, without which the worm 19 cannot be operated, thereby avoiding the setting of the device by a person not possessing the required key. The shaft 18 carries key operated means for holding it against rotary movement, and for this purpose, said shaft is provided with a diametrical slot 22 intersecting the socket 20, and a diametrical latch 23 is slidable within the slot 22 longitudinally of the shaft 18, and its terminals are seatable in notches 24 with which the inner end of the bearing 17 is provided, so that when the latch 23 is seated in the notches, this will prevent the rotation of the shaft 18. The latch 23 is moved into engagement with the bearing 17 and its notches 24 under the influence of a coiled wire expansion spring 25 surrounding the shaft 18 and confined between the latch 23 and a pin 26 or equivalent member carried by the shaft 18. The sleeve 4 can be readily turned with the use of the key 21. Thus, by inserting the key in the socket 20 and pushing the key inwardly, the end thereof will abut the latch 23 and said latch can be pushed against the tension of the spring 25 to remove the latch from the notches 24. The key can then be turned for rotating the shaft 18 and its worm 19, the worm in being rotated imparting rotary movement to the worm wheel 16 and sleeve 4.

From the foregoing, taken in connection with the drawing, it is believed that the advantages and attributes of the invention will be apparent without further comment being necessary.

Having thus described the invention, what is claimed as new is:

The combination with a speedometer casing and an adjusting shaft, of a bearing, tapered at one end and integral with the casing one end of said shaft being hollow and concealed within the bearing, and having a slot closed at both ends there being a notch within the tapered end of the bearing, a latch extending through the slot in the shaft and slidable longitudinally thereof, yielding means on the shaft and engaging the ends of the latch for holding it in the notch and locking the shaft against rotation, and a key insertible into the hollow shaft to disengage the latch from the bearing and rotate the shaft.

In testimony that I claim the foregoing as my own, I have hereto affixed my signature in the presence of two witnesses.

ROBERT H. BARNES.

Witnesses:
WM. HAWKINS,
M. A. COOK.